UNITED STATES PATENT OFFICE.

HANS A. FRASCH, OF NEW YORK, N. Y.

DYESTUFF.

1,323,263.      Specification of Letters Patent.      Patented Dec. 2, 1919.

No Drawing.      Application filed June 23, 1917. Serial No. 176,529.

*To all whom it may concern:*

Be it known that I, HANS A. FRASCH, a citizen of the United States, residing at New York, in the county of New York and State of New York, have invented a certain new and useful Improvement in Dyestuffs, of which the following is a full, clear, and exact description.

The object of this invention is to recover from petroleum a substance from which dyestuffs may be obtained.

As known, some sulfonic, azo and nitro products may be obtained from petroleum which have the property of dyeing wool and silk but compared with other direct dyestuffs such as are derived from coal tar, they lack strength and purity and are correspondingly of smaller economic value. This deficiency I find to be due to the fact that the raw material from which the ultimate dyestuff is derived is complex and constituted of a large number of individual constituents which are diversely affected by the treatments applied to convert the material for use as a dye. By the present invention I effect a more complete separation of these complex products and recover therefrom a new substance which I term "petracin", which may be employed as a base from which various valuable dyestuffs of diverse colors and properties may be obtained.

By my invention two varieties of petracin may be obtained, which I designate as "petracin A" and "petracin B", of which the former is soluble in water and in acidulated solution is a direct dyestuff for wool or silk, dyeing the same a yellow color, while the latter, petracin B, is insoluble in water or very sparingly so and upon proper treatment, such as hereinafter stated, will combine with alkalis or other basic substances and form products which are soluble in water and will dye cotton, wool or silk without mordant in either alkaline or acidulated solution.

Briefly stated, the invention is substantially as follows: The raw materials from which the dyestuffs may be produced are constitutents of petroleum and may consist of crude petroleum, petroleum distillates, or other derivatives thereof, such as the products resulting from treatment of petroleum or its distillates with an inorganic acid and more particularly the products obtained by treating distillates of petroleum with sulfuric acid, which products are technically known as sludge or sludge coke. To properly define the raw material, it may be said to embody those constituents of a particular crude oil, distillates or other derivatives thereof which are affected and reacted upon by inorganic acids, such, for example, as sulfuric acid.

In order to illustrate my invention by reference to a specific example without thereby intending to limit myself thereto: As an example of suitable raw material I may employ the products obtained by the treatment of the heavier distillates of petroleum with sulfuric acid, a material technically known as sludge. This material after leaving the agitators of petroleum refineries is freed, by well known means, such as lixiviation, from excess of sulfuric acid it may contain and is then heated to boiling point in a solution of an alkali or a carbonate of an alkali of proper strength to bring the available oxidized and sulfonated organic products into solution. The soluble products thereby obtained are then separated from the insoluble tar residue and precipitated from the solution by the addition of sodium chlorid. The particular process thus far described follows well known methods.

A solution of the precipitate obtained as described is next caused to be reacted upon by compounds containing oxygen and halogen as, for example, sodium hypochlorite. In that particular case a solution of sodium hypochlorite may be added to a solution of the sludge precipitate, heat being applied to assist in causing precipitation which ensues. The application of heat is continued until precipitation ceases. The quantity of sodium hypochlorite is governed by the amount of insoluble products obtainable from the particular raw material used. The precipitate is then separated from the liquid by filtration or other suitable means and constitutes the material which I have referred to as petracin B, while the liquid from which the precipitate has been separated contains the product which I have called petracin A in solution.

The introduction of the halogen oxid into the process may be accomplished by any well known method. It may be introduced by means of nitromuriatic acid. Chlorid of lime may also be used and, in that case, the insoluble lime may be removed from the solution before heat is applied. In any one of these instances the halogen oxid is the reaction agent and in so far as the creation and separation of the soluble and insoluble products petracin A and petracin B are concerned, the result is the same.

The invention may be practised in a great variety of ways. It may be applied to the crude mixture of products such as are obtained, as described, from so-called paraffin acid sludge, or I may use the crude products as they are obtained by lixiviation of sludge and treatment and separation of the lixiviated products by means of alkali or lime and sodium chlorid; or it may be applied to the azo or nitro products thereof. The raw products employed in the process may vary greatly in composition according to their source and, consequently, the proportion and strength of the halogen oxid, e. g. the hypochlorite solution, must be more or less modified and adjusted to meet such variations.

As stated, the halogen oxid may be introduced in the process in connection with an alkali, or the acid itself may be used. In this latter instance the preferred method of carrying out the process is to dissolve one hundred parts of the crude materials heretofore mentioned in one thousand parts of water, or approximately these proportions, adding thereto one hundred parts of the requisite quantity of nitromuriatic acid and, subsequently neutralizing with an alkali. The precipitated product of this invention which, as previously stated, I term "petracin B", is of a yellow to brown color, insoluble in hot and cold water or in glycerin, partly soluble in alcohol, and if heated with nitric acid of any concentration it becomes more or less soluble in water and is then rendered soluble by alkali forming therewith a compound which can be precipitated from its solution by hydrochloric acid or sodium chlorid and which will dye cotton, wool or silk without mordant from bright orange to a dark brown color and from it a variety of other valuable dyestuffs may be obtained. If heated in a solution of a salt of a halogen oxid in the presence of an alkali, it will also form a soluble product which will dye cotton, wool or silk without mordant a yellow color.

What I claim is:—

1. In the process of producing dyestuffs from petroleum, exposing constituents thereof to reaction with inorganic acids and exposing the product to the action of a halogen in the presence of an oxidizing agent and thereby producing a soluble and an insoluble product and then separating the insoluble from the soluble product.

2. In the process of producing dyestuff or products obtained in the treatment of petroleum substances with inorganic acids, exposing said products to the action of a halogen in the presence of an oxidizing agent and thereby producing a soluble and an insoluble product, applying heat, and then separating the insoluble from the soluble product.

3. In the process of producing dyestuff exposing petroleum products derived from treatment of petroleum distillates with sulfuric acid, to the action of a halogen in the presence of an oxidizing agent and thereby producing a soluble and an insoluble product and then separating the insoluble from the soluble product.

4. In the process of producing dyestuff from petroleum, exposing constituents thereof to the action of inorganic acid and exposing the product to the action of nitromuriatic acid and thereby producing a soluble and an insoluble product and then separating the insoluble from the soluble product.

5. In the process of producing dyestuff exposing petroleum products obtained by treating petroleum distillates with sulfuric acid, to the action of nitromuriatic acid and thereby producing a soluble and an insoluble product and then separating the insoluble from the soluble product.

6. A new product of petroleum resultant from the exposure of petroleum products, derived from the treatment of petroleum substances with an inorganic acid, to the action of a halogen and an oxidizing medium, said product being insoluble in water and distinguished by forming, upon reaction with nitric acid and neutralization with alkali, a soluble dyestuff which will dye wool or silk without mordant from a yellow to brown color.

In testimony whereof I have hereunto set my hand this 22d day of June A. D. 1917.

HANS A. FRASCH.

Witnesses:
 Wm. H. Finckel,
 Lillie M. Keeler.